United States Patent [19]

Lucchini et al.

[11] 4,249,632
[45] Feb. 10, 1981

[54] SAFETY DEVICE FOR THE PROTECTION OF PEDESTRIANS

[75] Inventors: Erich Lucchini, Wolfsburg; Martin Kramer, Gaimersheim, both of Fed. Rep. of Germany

[73] Assignee: Volkswagenwerk Aktiengesellschaft, Wolfsburg, Fed. Rep. of Germany

[21] Appl. No.: 25,751

[22] Filed: Mar. 30, 1979

[30] Foreign Application Priority Data

Apr. 1, 1978 [DE] Fed. Rep. of Germany ....... 2814107

[51] Int. Cl.³ .............................................. B60R 21/14
[52] U.S. Cl. .................................. 180/274; 180/69 R
[58] Field of Search ................... 180/69 R, 69 C, 274, 180/275, 276, 277, 278, 279, 280, 281; 280/770, 753, 735, 728; 293/15, 16, 9

[56] References Cited

U.S. PATENT DOCUMENTS

| 1,333,797 | 3/1920 | Lorenzo ................................. 293/15 |
| 1,748,371 | 2/1930 | Trieschmann ......................... 293/15 |
| 3,829,140 | 8/1974 | Jehu et al. ............................ 180/274 |
| 4,093,290 | 6/1978 | Pearson ................................. 293/15 |

FOREIGN PATENT DOCUMENTS 954430 12/1949 France ........................................ 293/15

Primary Examiner—David M. Mitchell
Attorney, Agent, or Firm—Brumbaugh, Graves, Donohue & Raymond

[57] ABSTRACT

A safety device for the protection of pedestrians involved in a collision with a vehicle is arranged in the zone of the front hood of the vehicle. The safety device is in the form of a mechanism for raising the rear of the front hood, which mechanism can be triggered by a sensor installation arranged in the zone of the front bumper of the vehicle for detection of a collision with the pedestrian. Upon detection of a collision, the mechanism raises the front hood from a rest position to an impact position in which the potential for contact between the pedestrian's head and the windshield are reduced.

10 Claims, 3 Drawing Figures

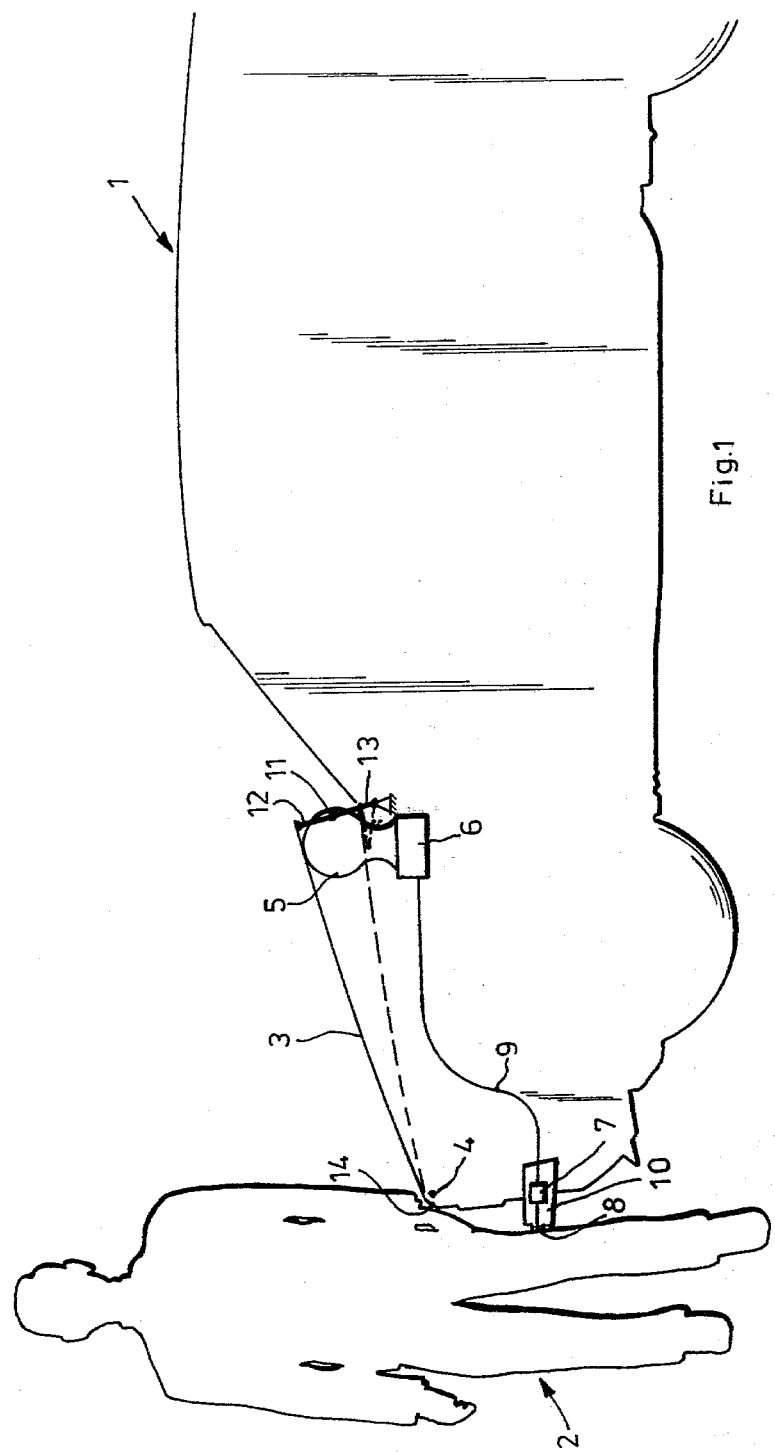

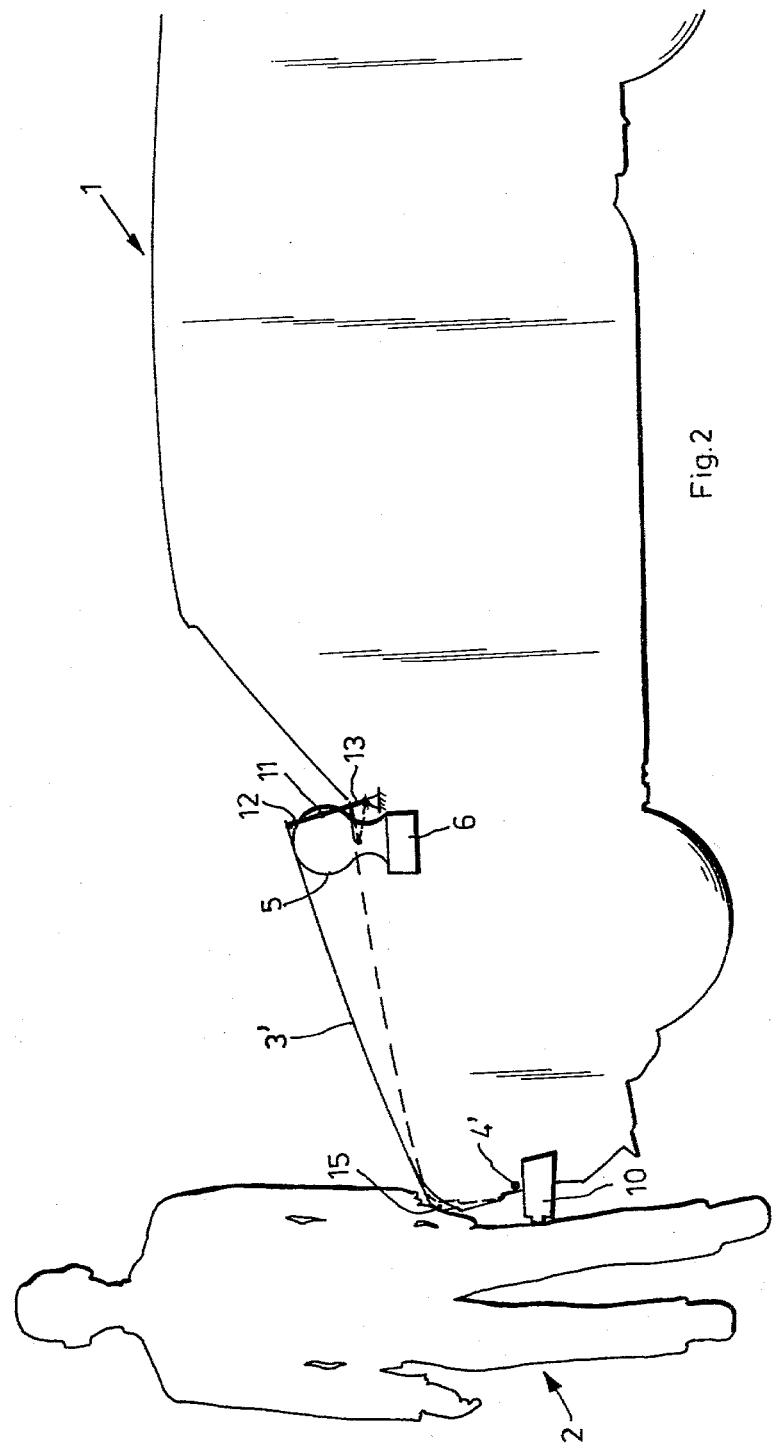

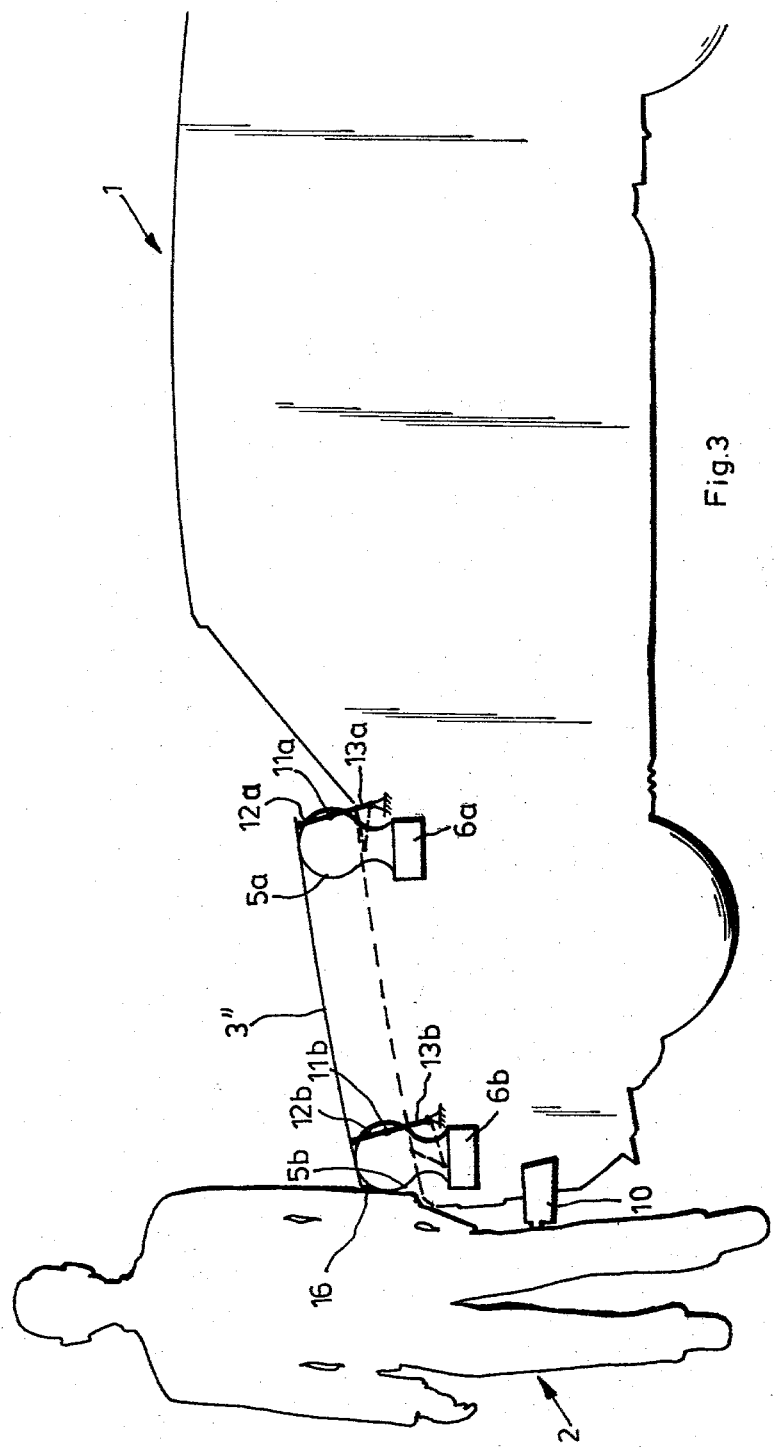

SAFETY DEVICE FOR THE PROTECTION OF PEDESTRIANS

BACKGROUND OF THE INVENTION

It is known that pedestrians and bicycle riders are especially endangered in road traffic and are exposed to a considerable chance of injury in the event of a collision with a vehicle because of the absence of suitable protection. These injuries are due in particular to the fact that in a collision between a vehicle and a pedestrian, parts of the pedestrian's body will directly strike the hard and relatively unyielding body parts of the vehicle. The head of an adult pedestrian is in particular danger in a collision with a vehicle because his head will strike the vehicle in the relatively hard area of the transition from the hood to the windshield or on the windshield proper, thereby suffering considerable injury.

In order to reduce injuries produced when the body of a pedestrian strikes the front hood of a vehicle, it has been proposed that the vehicle be provided with an approximately wedge-shaped front part having a front edge which is as soft as possible. However, this does not eliminate the problem of the relatively hard rear portions of the front hood of the vehicle which rise sharply to form the windshield and, along with other parts, cause serious head injuries. Intercepting loops have likewise been proposed for the protection of pedestrians. These loops, after being triggered by sensor devices arranged, e.g., on the bumper, are folded upward and hold the pedestrian on the hood after a collision so that he cannot be hurtled back to the street from the hood. This device, however, also cannot diminish the dangers of injury that occur when the head and the upper body of the pedestrian strike the windshield at the rear zone of the hood.

SUMMARY OF THE INVENTION

It is the purpose of the present invention to create a safety device which considerably reduces the danger of injury to the head and the upper body of a pedestrian which can occur upon striking the front hood of a vehicle during a collision. In particular, it is its aim to considerably eliminate the sharpness of the rise in the zone of impact in the rear part of the front hood, which zone in the typical vehicle is relatively hard and unyielding, by means of mechanisms that displace the front hood out of a rest position into a raised impact position.

In an illustrative embodiment of the invention a collision with a pedestrian is detected by a sensor installation. This sensor operates a mechanism that causes the front hood to be displaced into an impact position which is lifted relative to the hood's normal or rest position. As a result there is created, with respect to chest or head impact of the pedestrian, a deformation path on the vehicle body that is effective in providing more favorable energy dissipation and a reduction in head and chest decelerations, thus producing less risk of injury. At the same time, the lifting of the front hood, especially in its rear zone, prevents an impact of the pedestrian's head on the especially dangerous zone of the cowl panel of the lower windshield frame and the windshield wiper and supports, respectively.

In accordance with one embodiment of the invention, the front hood may be designed to be pivotable around a horizontal swivel pin arranged on the front end of the vehicle. With such an arrangement a mechanism for lifting the front hood is arranged in the zone of the rear of the front part of the car. In accordance with another embodiment, mechanisms for lifting the front hood essentially parallel to its rest position are provided in the front and rear zones of the front part of the car.

In order to maintain and guide the displacement movement of the front hood when triggered by the sensor installation, there are provided, in accordance with a further proposal of the invention, mechanisms for limiting the displacement movement. These mechanisms may be formed by double-winged hinges which are held with one wing on the front hood and with the other wing on the vehicle frame.

A further feature of the invention involves utilizing gas bag devices as the mechanisms for raising the front hood, which bags are maintained in a folded condition underneath the front hood when in the rest state. These devices are triggered by signals from the sensor installation and can be blown up by means of a propellant. The gas bag devices are designed to extend essentially over the entire width of the vehicle. According to the invention, known types of gas bag devices are provided with flow-off valves or discharge openings that ensure favorable energy absorption upon impact with the pedestrian's body by throttling air losses produced on outflow. Inasmuch as between the first contact of the pedestrain with the bumper of the vehicle and the impact of the head on the vehicle hood, approximately 80 ms pass, as determined by the pertinent measurements, there is sufficient time to inflate the gas bag device through a corresponding signal from the sensor installation.

Finally, it may be of advantage if the front hood, in a known manner, is made of some easily deformable material, at least on its front edge, so that the injuries suffered when the pelvis of the pedestrian hits the front edge of the hood can be reduced.

BRIEF DESCRIPTION OF THE DRAWINGS

Further advantages and essential characteristics of the invention are indicated in the following description, which explains in detail the examples of embodiments of the invention, and in the drawings in which:

FIG. 1 is an illustrative embodiment of the invention in which the rear of a vehicle hood is raised during an impact, FIG. 2 is an embodiment similar to FIG. 1 in which the hood is free to pivot forward, and FIG. 3 is an embodiment in which the front and rear of the hood are raised an equal amount.

DESCRIPTION OF EXEMPLARY EMBODIMENTS

The individual figures show different embodiments of a front hood 3 of a vehicle 1 which can be raised by means of a gas bag device 5. Similar parts shown in the various figures bear like reference numbers, possibly with a superscript.

In FIG. 1 the vehicle is shown in a side view with a pedestrian 2 being struck by the vehicle. The front hood 3 of the vehicle can be pivoted around an essentially horizontally extending swivel pin 4 placed at the front edge of the car. The hood 3 can be displaced by means of the gas bag 5 which extends essentially across the entire width of the vehicle, so as to move it from a rest position indicated by broken lines to an interception position indicated by full lines. In the rest position, the gas bag 5 is folded and placed underneath the front hood 3, approximately in the zone under the cowl. It can be inflated in the shortest possible time through a gas generator 6. The gas generator, in a known manner, may include a gas tank or a gas-producing solid propellant charge which is ignited by means of a sensor 7 over a signal line 9. As shown in FIG. 1, the sensor is suitably arranged in the zone of the front bumper bar 10 of the vehicle 1 and has sensor strips 8 which detect a collision with the pedestrian.

The rear of the hood has a safety or interception hinge 11 with two wings 12 and 13 which can be swivelled relative to each other and whose ends are connected with the hood 3 and the vehicle frame, respectively. This safety hinge which is folded together in the rest position of the front hood 3, limits the displacement path of the front hood. The front edge 14 of the hood 3 preferably is made of a very deformable material, e.g., a plastic material. The front edge is designed to provide favorable impact conditions for the pelvic region of the pedestrian 2 upon being struck by the vehicle 1.

The embodiment in accordance with FIG. 2 differs from the one in FIG. 1 merely in that the vehicle front hood 3' extends downwardly, approximately as far as the zone of the front bumper bar of the vehicle, and is made pivotable about a horizontally extending swivel pin 4' located in that zone. By means of this embodiment, inflation of the gas bag 5 not only causes the front hood 3' to be raised vertically in its rear zone, but also causes the zone of its front edge 15 to move forward in the direction of travel. This forward displacement results in a small, but favorable, deformation path in the pelvic impact region. In this case, it is useful if the zone of the front edge 15 of the front hood 3' is composed of a deformable material.

Finally, in the embodiment in FIG. 3, two gas bags, 5a and 5b are provided, one each arranged in the front and the rear zones of the front part of the vehicle 1, e.g. under the front hood 3''. They provide an approximately parallel lifting of the front hood 3'' in case of a collision with a pedestrian 2. These air bags, which are provided with corresponding gas generators 6a and 6b, respectively, also extend essentially over the entire width of the vehicle. In order to limit the displacement of the front hood 3'', two safety hinges 11a and 11b are provided which hold and guide the hood during its displacement into the impact position. Here, again, the front edge 16 of the front hood 3'' is made of a very deformable material.

The essential advantage of the devices that appear in the drawings is that the lifting of the front hood, in particular in the rear of the front part of the car, creates a deformation path on the car body for the impact area of the head and the upper body of the pedestrian, which path effects a favorable energy dissipation by providing a decrease in the head and chest decelerations of the pedestrian hit by the vehicle and thereby a smaller risk of injury. At the same time the devices prevent the head of the pedestrian from striking the especially dangerous area of the cowl panel, as well as the bottom of the windshield frame with the windshield wiper supports. In particular when a pedestrian lands on the hood during a collision, the hood, as well as the hinges and the air bags, can dissipate the impact energy by being deformed and pushed back into their rest positions. The deformation of the hood will form a relatively soft pocket that restrains the motion of the pedestrian. By designing this structure with a predetermined strength, it can be made to begin to collapse before the force reaches a level at which the pedestrian will receive a serious injury. If the hood is not raised, as in the prior art, the various hard vehicle components under the hood, e.g. the motor and transmission, create a very short deformation path for the hood. Also a very hard surface after deformation is created, which surface will certainly injure the pedestrian's body because its strength exceeds the tolerance of the human body.

The lodging of the air bags underneath the front hood does not require any changes in the outer contour of the vehicle and this positioning assures that the air bag is protected from damage by alien bodies and the like. In the embodiments as per FIG. 2, and in particular as per FIG. 3, the front hood can also be made of energy-absorbing deformable material in its front region so that pelvic impact can also be substantially alleviated.

It is evident that in place of the safety or interception hinges for holding and guiding of the front hood, other holding devices, e.g., catch hooks, may be used.

While the present invention has been particularly shown and described with reference to preferred embodiments thereof, it will be evident to those skilled in the art that various changes in form and detail may be made without departing from the sprit and scope of the invention.

We claim:

1. A safety device for the protection of pedestrians involved in a collision with a vehicle having a front hood extending in a generally horizontal plane above the vehicle frame and covering a forward compartment in a front part of the vehicle comprising:
   displacement means for the displacement of the front hood from a rest position into an impact position raised relative to the rest position, said displacement means being arranged in the zone of the front hood of the vehicle; and
   sensor means arranged in the front zone of the vehicle for detection of a collision with the pedestrian, said displacement means being triggered into operation by said sensor means upon detection of a collision with the pedestrian.

2. A safety device as in claim 1, wherein said displacement means include a horizontal swivel pin arranged at the front end of the vehicle, the front end of the front hood being pivotable about said pin, and a lifting mechanism in the rear of the front part of the car for lifting the rear end of the front hood.

3. A safety device as in claim 1, wherein said displacement means include lifting mechanisms in the front and in the rear zones of the front part of the car for lifting the front hood from its rest position to a raised parallel impact position.

4. A safety device as in claims 1, 2 or 3 wherein the displacement means include limit means for limiting the displacement of the front hood.

5. A safety device as in claim 4, characterized in that the limit means for limiting the displacement of the front hood are formed by hinges with two wings, one wing being attached to the front hood and the other wing being attached to the vehicle frame.

6. A safety device as in claims 1, 2 or 3 wherein the displacement means comprise gas bag devices which in the rest state are maintained in a folded condition under the front hood and, upon being triggered by signals from the sensor means, are inflated by means of a propellant.

7. A safety device as in claim 6, wherein the gas bag devices extend essentially across the entire vehicle width.

8. A safety device as in claims 1, 2 or 3 wherein the front hood, at least at its front edge, is comprised of a deformable and energy-absorbing material.

9. A safety device as in claim 5 wherein the front hood, at least at its front edge, is comprised of a deformable and energy-absorbing material.

10. A safety device as in claim 7 wherein the front hood, at least at its front edge, is comprised of a deformable and energy-absorbing material.

* * * * *

UNITED STATES PATENT AND TRADEMARK OFFICE
CERTIFICATE OF CORRECTION

PATENT NO. : 4,249,632

DATED : February 10, 1981

INVENTOR(S) : Erich Lucchini et al.

It is certified that error appears in the above—identified patent and that said Letters Patent is hereby corrected as shown below:

First page, second column, under heading "FOREIGN PATENT DOCUMENTS" the following should be added:  --2613748  10/1977 W. Germany .... 280/728--;
Column 2, line 26, "pedestrain" should read --pedestrian--.

Signed and Sealed this

Ninth Day of June 1981

[SEAL]

Attest:

RENE D. TEGTMEYER

Attesting Officer     Acting Commissioner of Patents and Trademarks